United States Patent
Skafsgaard et al.

(10) Patent No.: US 11,933,308 B2
(45) Date of Patent: Mar. 19, 2024

(54) PUMP ASSEMBLY AND METHOD FOR CONTROLLING AN ELECTRIC MOTOR FOR DRIVING AN IMPELLER OF A PUMP UNIT OF A PUMP ASSEMBLY

(71) Applicant: GRUNDFOS HOLDING A/S, Bjerringbro (DK)

(72) Inventors: Martin Byskov Skafsgaard, Bjerringbro (DK); Susanne Hamann Gade, Bjerringbro (DK); Keld Benner Valbjørn, Bjerringbro (DK); Jan Carøe Aarestrup, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 0 days.

(21) Appl. No.: 17/550,396

(22) Filed: Dec. 14, 2021

(65) Prior Publication Data
US 2022/0186733 A1 Jun. 16, 2022

(30) Foreign Application Priority Data
Dec. 16, 2020 (EP) .................................... 20214690

(51) Int. Cl.
*F04D 15/00* (2006.01)
*F04D 13/06* (2006.01)
*H02P 7/29* (2016.01)

(52) U.S. Cl.
CPC ......... *F04D 15/0066* (2013.01); *F04D 13/06* (2013.01); *H02P 7/29* (2013.01); *H02P 2207/05* (2013.01)

(58) Field of Classification Search
CPC ............................. F04D 13/06; F04D 15/0066
See application file for complete search history.

(56) References Cited

U.S. PATENT DOCUMENTS

| 4,876,653 | A | * | 10/1989 | McSpadden | ......... G05D 11/132 700/265 |
| RE37,360 | E | * | 9/2001 | Duncan | .................... H02P 6/30 318/443 |
| 7,141,950 | B1 | | 11/2006 | Verge | |
| 2016/0094180 | A1 | * | 3/2016 | Ajima | .................... B62D 5/065 318/504 |
| 2017/0185054 | A1 | * | 6/2017 | Rudser | ....................... H02P 6/20 |
| 2017/0293293 | A1 | * | 10/2017 | Brownie | ............ G05B 23/0243 |
| 2017/0324366 | A1 | * | 11/2017 | Knorr | ..................... H02P 29/40 |
| 2020/0052800 | A1 | * | 2/2020 | Butka | .................... H04B 13/02 |
| 2020/0319656 | A1 | | 10/2020 | Fang et al. | |

FOREIGN PATENT DOCUMENTS

EP 2778423 A1 9/2014

* cited by examiner

Primary Examiner — Connor J Tremarche
(74) Attorney, Agent, or Firm — McGlew and Tuttle, P.C.

(57) ABSTRACT

A pump assembly with a pump unit comprising an impeller for pumping fluid, an electric motor for driving the impeller, a control module for controlling the speed of the electric motor in a control mode, and an interface for receiving a pulse width modulated (PWM) control signal with a duty cycle indicative of the speed of the electric motor. The control module is configured to interpret the PWM control signal at start-up of the electric motor per default in a configuration mode as a configuration bit sequence based on the duty cycle of the PWM control signal during a predetermined configuration window.

17 Claims, 12 Drawing Sheets

Fig. 12

PUMP ASSEMBLY AND METHOD FOR CONTROLLING AN ELECTRIC MOTOR FOR DRIVING AN IMPELLER OF A PUMP UNIT OF A PUMP ASSEMBLY

CROSS REFERENCE TO RELATED APPLICATIONS

This application claims the benefit of priority under 35 U.S.C. § 119 of European Application 20214690.8, filed Dec. 16, 2020, the entire contents of which are incorporated herein by reference.

TECHNICAL FIELD

The present disclosure relates to a pump assembly and a method for controlling an electric motor for driving an impeller of a pump unit of a pump assembly. In particular, the present disclosure applies to pump assemblies to be externally controlled by receiving a pulse width modulated (PWM) control signal.

TECHNICAL BACKGROUND

Water boilers, solar thermal systems or other heating systems often include one or more pump assemblies for circulating water in a heating circuit. The operation of water boilers, solar thermal systems or other heating systems is typically controlled by a central heating control unit. It is known that pump assemblies may comprise an interface for receiving a pulse width modulated (PWM) control signal from such a central heating control unit. For instance, the central heating control unit may command the pump assembly when to start/stop or at what speed to run.

For instance, EP 2 778 423 A1 describes a heating centrifugal pump assembly that is configured to receive a PWM speed signal from an external control.

In general, the PWM speed signal represents an analogue signal from digital source, wherein the PWM speed signal is characterized by the following attributes: pulse shape, amplitude, duty cycle and frequency. Typically, the pulse shape is rectangular, but may have other forms, such as triangular or sawtooth-like. The amplitude is typically fixed. The duty cycle describes the fraction of the cycle duration during which the signal is in a high state ("on"). The frequency determines the cycle period. The duty cycle is typically used to control the current speed of the motor, e.g. a duty cycle of 50% may be interpreted as 50% of the pump motor speed or a duty cycle below 10% may be interpreted as a signal to switch off the pump motor.

However, it is desirable to provide a pump assembly that is able to receive more information, configurations or commands than just start/stop or the current speed via the PWM interface with as little changes and adaptations to existing pump assemblies as possible.

SUMMARY

According to a first aspect of the present disclosure, a pump assembly is provided comprising:
 a pump unit comprising an impeller for pumping fluid,
 an electric motor for driving the impeller,
 a control module for controlling the speed of the electric motor in a control mode,
 an interface for receiving a pulse width modulated (PWM) control signal with a duty cycle indicative of the speed of the electric motor, wherein the control module is configured to interpret the PWM control signal at start-up of the electric motor per default in a configuration mode as a configuration bit sequence based on the duty cycle of the PWM control signal during a pre-determined configuration window.

The control module may thus comprise a PWM bit sequence detector module that may be implemented in form of software or a software update on a microcontroller of a new or existing pump assembly. The microcontroller may be part of electronics for controlling the electric motor for driving the impeller of the pump unit, wherein the electronics are arranged in an electronics housing of the pump assembly.

It is important to note that it is not a frequency change in the PWM signal that is used for distinguishing the bits of a bit sequence in the PWM control signal. Instead, changes in the duty cycle of the PWM control signal are used for interpreting a bit sequence in the configuration mode, because that does not require an extra hardwired input circuit needed for detecting frequency changes. For that reason, the control module is configured to start per default in the configuration mode during a pre-determined configuration window after start-up of the electric motor. Otherwise, the changes of the duty cycle of the PWM control signal would be interpreted as switching the motor on for each "1" bit and off for each "0" bit. So, the configuration mode is the default mode for interpreting the PWM control signal.

Optionally, a minimum length of the configuration window may be defined by a pre-determined number of PWM pulses or a pre-determined time period. For instance, a minimum number of pulses, e.g. six pulses, may be needed between changes of the duty cycle to ensure a stable and reliable interpretation of the logical bit sequence. The modulation frequency may range between 100 Hz and 1 kHz. The time $DC_{\Delta t}$ between duty cycle changes may be pre-defined at a value between 20 ms and 500 ms depending on the modulation frequency. A pre-defined start bit sequence at the start of the configuration bit sequence may have a certain number of bits, e.g. six start bits "010101".

For instance, the pre-determined number of PWM pulses may be 250, so that the minimum length of the configuration window may be 250 ms at 1 kHz and 2.5 s at 100 Hz, which gives room for at least ten bits to check for a valid start bit sequence. The configuration window may at least be open for the minimum length in order to reliably decide whether a valid start bit sequence was received or not. If a valid start bit sequence is received, the configuration window may be kept open for receiving more data. Otherwise, the configuration window may be closed, i.e. the control module may switch from the configuration mode to the control mode. In the control mode, the duty cycle may be interpreted as "usual" as the motor speed setting.

Optionally, the control module may be configured to switch from the configuration mode to the control mode if the interpreted configuration bit sequence is not compliant with a pre-determined data protocol, for example a Universal Asynchronous Receiver Transmitter (UART) protocol. So, whenever the pre-determined data protocol is violated, the configuration window may be closed. This is even possible before a minimum length of the configuration window has passed.

Optionally, the control module may be configured to switch from the control mode to the configuration mode if the control module recognizes a valid synchronization sequence in the PWM control signal. A valid synchronization sequence may contain the pre-defined start bit sequence at the start of the configuration bit sequence having a certain number of bits, e.g. six synchronisation bits "010101". This allows to switch to a configuration mode even when the pump motor is currently running according to the speed previously set in the control mode by the PWM signal. The control module may be configured to maintain the speed during the configuration window according to the latest speed setting in control mode.

Optionally, each logical bit of the configuration bit sequence may be defined by a value and/or a pattern of the duty cycle over a pre-determined number of pulses. For instance, at least six consecutive pulses within $DC_{\Delta t}$ with a duty cycle below 15% may define a "0" bit, whereas at least six consecutive pulses within $DC_{\Delta t}$ with a duty cycle above 15% may define a "1" bit.

Optionally, the control module may be configured to extend the length of the configuration window at least until it has received the full and valid configuration bit sequence under the condition that a valid synchronization sequence was detected in the interpreted configuration bit sequence. For instance, a full and valid configuration bit sequence may be compliant with a pre-determined data protocol, for example a UART protocol. A full and valid configuration bit sequence with four registers according to the UART protocol may comprise 62 bits, which need at least 1.24 seconds for $DC_{\Delta t}$=20 ms at 1 kHz and 3.7 seconds for $DC_{\Delta t}$=60 ms at 100 Hz. The configuration window may be extended accordingly to receive one or more full and valid configuration bit sequences.

Optionally, the control module may be configured to send an acknowledgment signal via the interface after it has received the full and valid configuration bit sequence. So, the PWM interface may be used for a bidirectional communication with an external control. The acknowledgment signal may close the configuration window. The external control may stop sending the bit sequence when the acknowledgment signal is received. Otherwise, the external control may be configured to repeat sending the bit sequence.

Optionally, the control module may be configured to control the speed of the electric motor according to a pre-determined setting during the configuration window. This pre-determined speed setting may be fixed or adaptive. For instance, it may be the latest speed setting received by the PWM control signal.

Optionally, the control module may be configured to control the speed of the electric motor in the control mode according to the received PWM control signal after lapse of the configuration window.

Optionally, a valid configuration bit sequence may have a pre-determined maximum number of bits compliant with a pre-determined data protocol, for example a Universal Asynchronous Receiver Transmitter (UART) protocol.

According to a second aspect of the present disclosure, a method is provided for controlling an electric motor for driving an impeller of a pump unit of a pump assembly comprising:
receiving a pulse width modulated (PWM) control signal at an interface of the pump assembly,
interpreting the PWM control signal at start-up of the electric motor per default in a configuration mode as a configuration bit sequence based on the duty cycle of the PWM control signal during a pre-determined configuration window, and
controlling the speed of the electric motor in a control mode according to the duty cycle of the received PWM control signal after lapse of the configuration window.

Optionally, a minimum length of the configuration window may be defined by a pre-determined number of PWM pulses or a pre-determined time period.

Optionally, the method may further comprise validating the interpreted configuration bit sequence for being compliant with a pre-determined data protocol, for example a Universal Asynchronous Receiver Transmitter (UART) protocol.

Optionally, the method may further comprise switching from the configuration mode to the control mode if the interpreted configuration bit sequence is found to be not valid.

Optionally, the method may further comprise switching from the control mode to the configuration mode if a valid synchronization sequence is recognized in the PWM control signal.

Optionally, each logical bit of the configuration bit sequence may be defined by a value and/or a pattern of the duty cycle over a pre-determined number of PWM pulses.

Optionally, the method may further comprise extending the length of the configuration window at least until the full configuration bit sequence has been received under the condition that a valid synchronization sequence was detected in the interpreted configuration bit sequence.

Optionally, the method may further comprise sending an acknowledgment signal via the interface after having received the full and valid configuration bit sequence.

Optionally, the method may further comprise controlling the speed of the electric motor according to a pre-determined setting during the configuration window.

Optionally, a valid configuration bit sequence may have a pre-determined maximum number of bits compliant with a pre-determined data protocol, for example a Universal Asynchronous Receiver Transmitter (UART) protocol.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
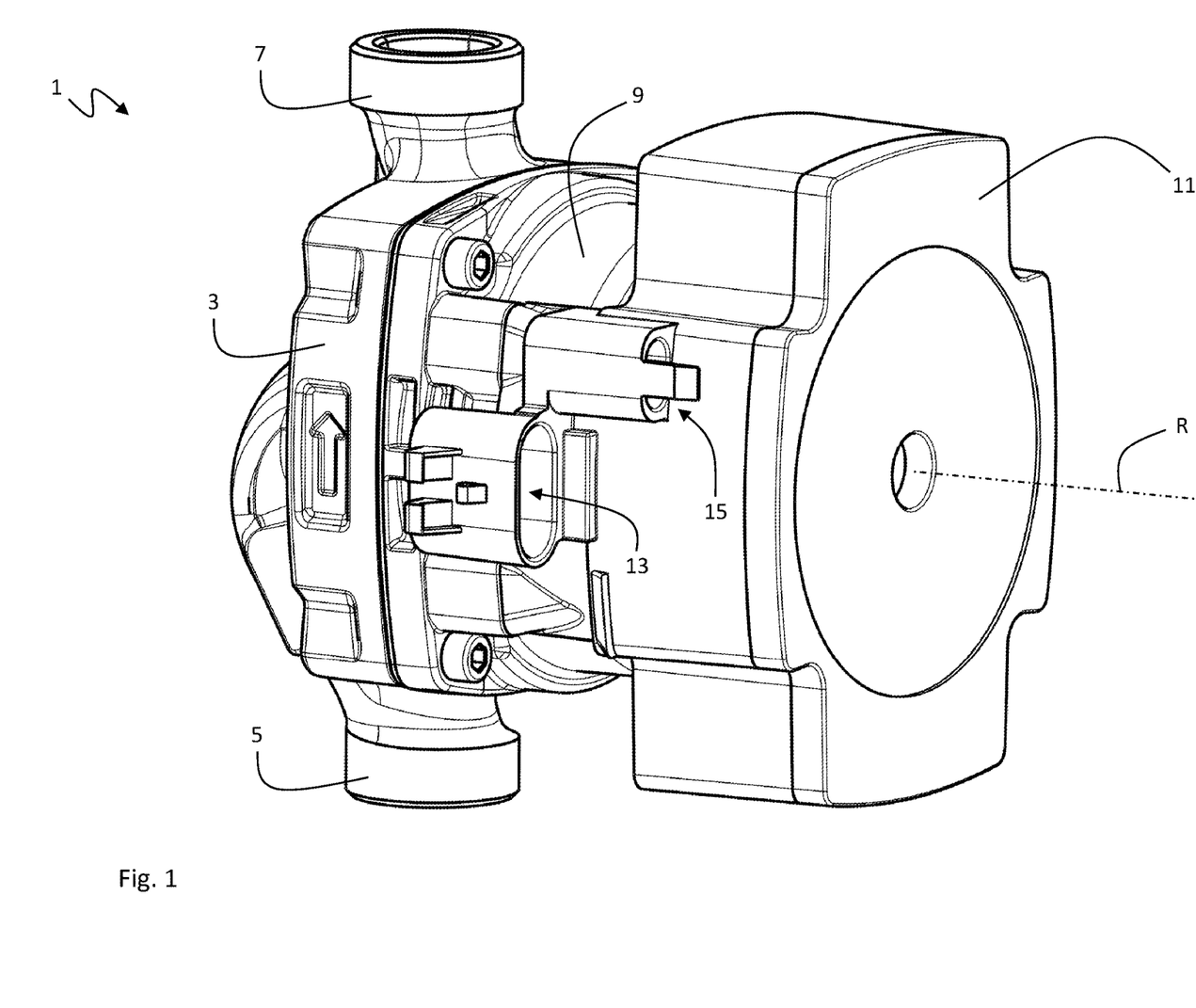
FIG. 1 is a perspective view of an example of a pump assembly with a control module being configured according to the invention disclosed herein.

Referring to the drawings, FIG. 1 shows a pump assembly 1 as a compact wet-running centrifugal pump unit for circulating water in a heating system or a solar thermal energy (STE) system. The pump assembly 1 comprises a pump housing 3 with a suction inlet 5 and a pressure outlet 7. An impeller (not visible) being rotatable about a rotor axis R is arranged within the pump housing 3. A permanent magnet synchronous electric motor (PMSM) is arranged with a motor housing 9 for driving the impeller about the rotor axis R. The motor housing 9 is mounted to the pump housing 3 axially in view of the rotor axis R. An electronics housing 11 is arranged at an axial end of the motor housing 9. The electronics housing 11 comprises electronics for controlling the speed of the electric motor, e.g. a frequency converter. The electric motor and the electronics are powered via a power plug 13 located at a lateral side of the pump assembly 1. Furthermore, the pump assembly 1 comprises a PWM socket 15 for receiving a pulse-width modulated (PWM) control signal via cable from an external control.

The hardware as visible in FIG. 1 may be an already existing pump assembly 1 or very similar to it. However, the electronics located in the electronics housing 3 comprises a control module that differs from the prior art. The control module may be implemented in form of a software or a software update installed on existing components, e.g. a microcontroller, of the electronics in the electronics housing 11. Alternatively, or in addition, the electronics may comprise dedicated hardware components and/or circuitry for implementing the control module.

Figure 2A:
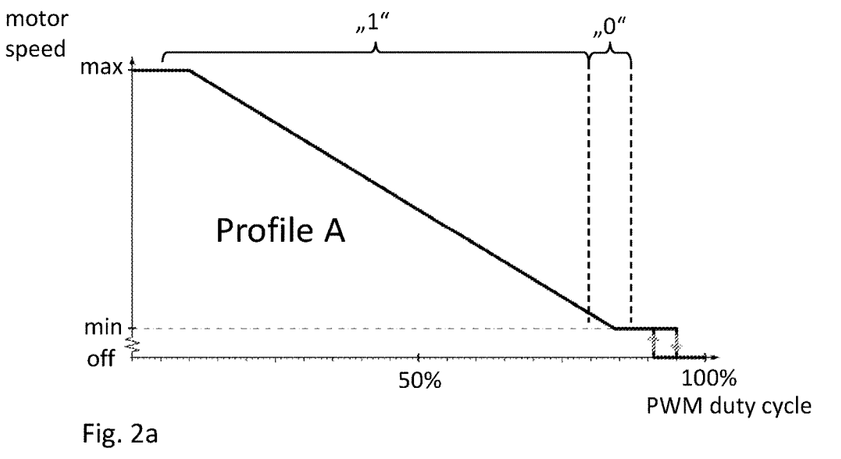
FIGS. 2a and 2b are schematic diagrams of different PWM input profiles.
Figure 2B:
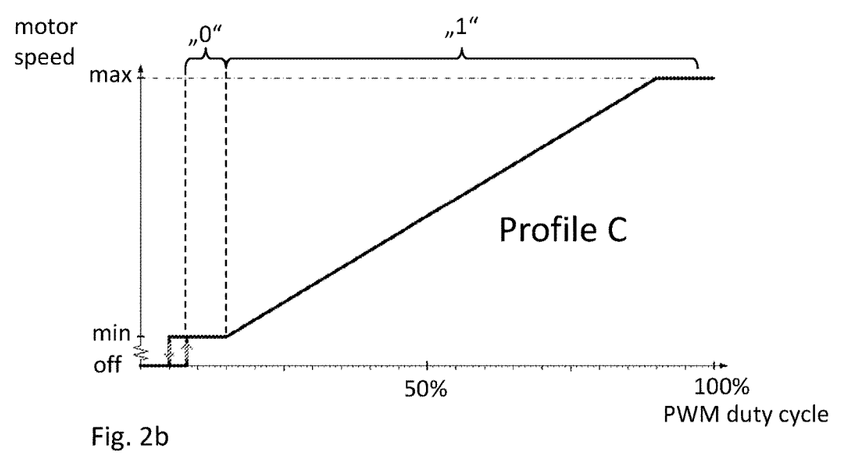

FIG. 2a,b show two different PWM profiles for controlling the motor speed according to a PWM control signal received from an external control via PWM socket 15. FIG. 2a shows a PWM profile A typically used in a heating system. When the control module is in a control mode, the motor speed is set according to the duty cycle of the received PWM control signal. At low duty cycles, e.g. below 10%, the motor speed is set to maximum speed for safety reasons. For instance, in case of a cable breakage in a water boiler system, the pump assembly 1 will continue to run at maximum speed to transfer heat away from a primary heat exchanger of the water boiler system. Between 10% and 84% duty cycle, the speed scales linearly downward to a minimum speed above 84% duty cycle. At duty cycles above 84%, a hysteresis prevents the electric motor from starting and stopping if the PWM control signal fluctuates around a switching point. Thus, the motor is switched off for duty cycles above 95% and switched on at a duty cycle of 91%. FIG. 2b shows a PWM profile C typically used in a solar thermal energy (STE) system. The profile C as shown in FIG. 2b is somewhat inverted in comparison to profile A as shown in FIG. 2a. Again, when the control module is in a control mode, the motor speed is set according to the duty cycle of the received PWM control signal. The motor is switched on at 5% duty cycle and run at a minimum speed up to a duty cycle of 15%. Between 15% and 90% duty cycle, the speed scales linearly upward to a maximum speed for duty cycles above 90%. If the duty cycle is reduced from 15% downward, the motor is switched off at 8% duty cycle for safety reasons. So, if a PWM control signal is missing, for example due to a cable breakage, the pump motor will stop to avoid overheating of the solar thermal system. The hysteresis prevents also for profile C the electric motor from starting and stopping if the PWM control signal fluctuates around a switching point.

The control module in this example comprises a PWM bit sequence detector module that is able to detect digital bits in the PWM control signal irrespective of whether the profile A or profile C is used. The plateau of minimum speed setting for duty cycles between 84% and 95% in profile A and for duty cycles between 8% and 15% in profile C may be interpreted as a logic bit "0". Any speed setting above may be interpreted as a logic bit "1". There is thus no need to change the frequency of the PWM control signal to communicate digital information via the PWM control signal. In the following, use of the profile C is assumed as an example.

Figure 3:
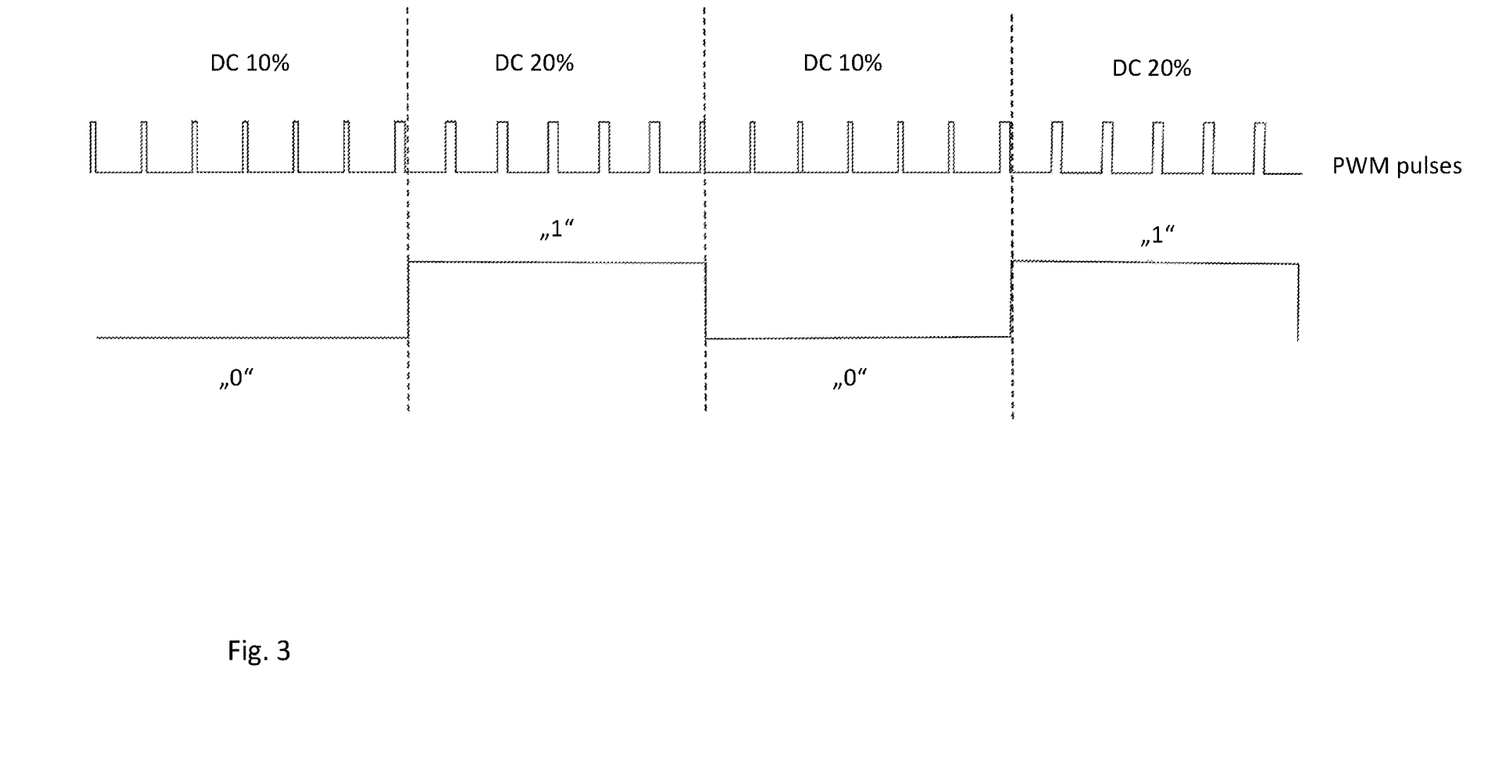
FIG. 3 is a view showing a bit sequence based on changes of the duty cycle in the PWM control signal.
Figure 4:
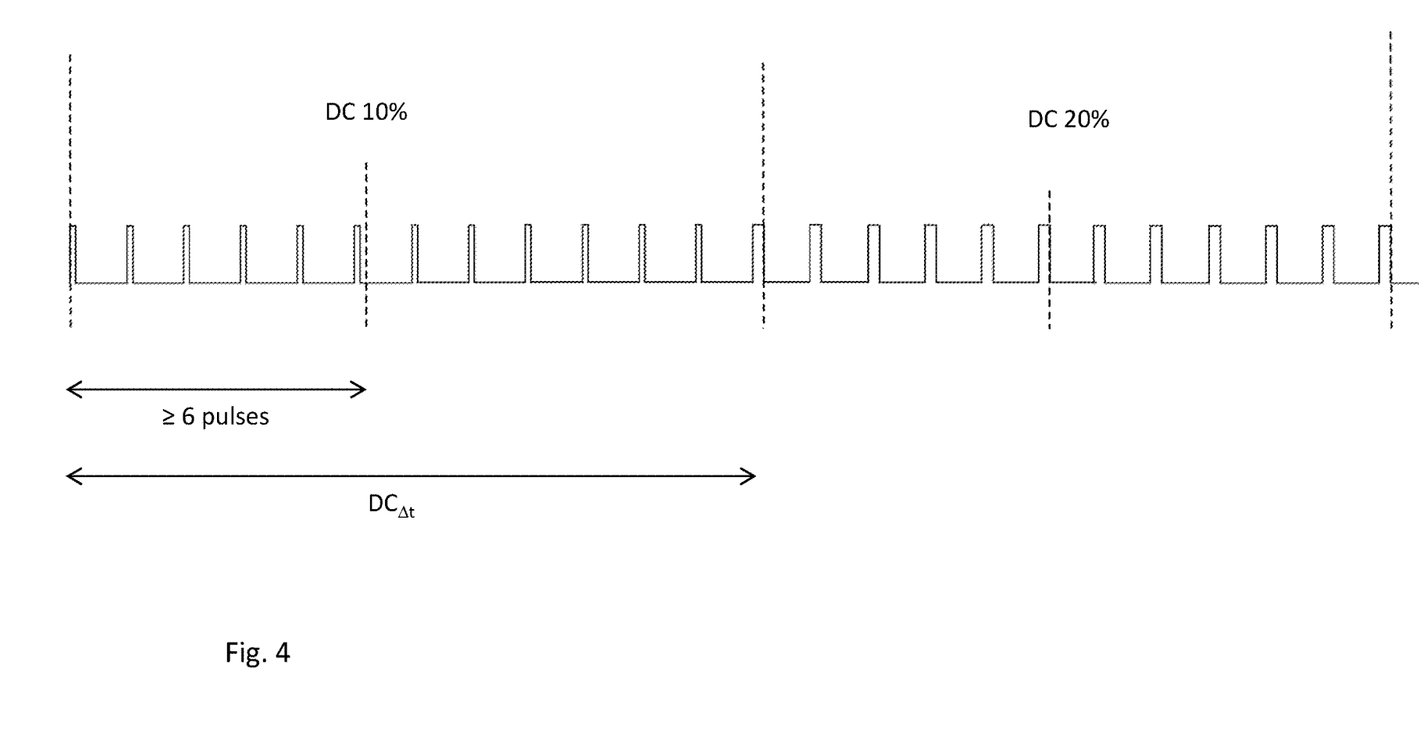
FIG. 4 is a view showing two bits based on changes of the duty cycle in the PWM control signal and $DC_{\Delta t}$.

FIG. 3 shows how the digital information in form of bit sequences may be communicated by changing the duty cycle between 10% and 20% in the profile C. As shown in FIG. 4, a certain minimum number of PWM pulses, e.g. six, may be needed to ensure a correct and reliable determination of the current duty cycle. The modulation frequency may range between 100 Hz and 1 kHz. A time $DC_{\Delta t}$ between duty cycle changes may be pre-defined at a value between 20 ms and 500 ms depending on the modulation frequency. For instance, six pulses are received within 6 ms at 1 kHz, so that three bits can be received within 20 ms. At 100 Hz, however, six pulses need at least 60 ms, so that $DC_{\Delta t}$ should be larger than 60 ms.

Figure 5:
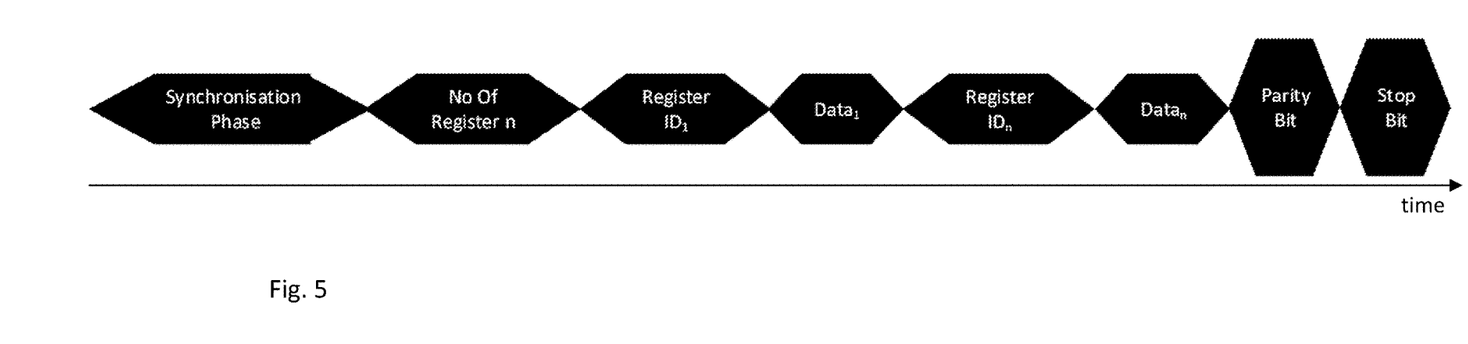
FIG. 5 is a view showing an example of a pre-determined UART protocol for receiving a pump configuration via the PWM control signal according to a preferred embodiment of the invention disclosed herein.

FIG. 5 shows an example of a pre-determined data protocol that the PWM bit sequence detector module expects to receive. It follows a Universal Asynchronous Receiver Transmitter (UART) standard. The first six bits are a pre-defined synchronisation sequence, i.e. a specific bit pattern, e.g. "101010". The next three bits indicate the data length or number of registers to follow, e.g. "100", i.e. four registers. Then, there are 13 bits following for each register, of which the first five bits identify the register and the last eight bits contain the data of each register. The configuration bit sequence may further comprise an even parity bit for cross-checking the last register data for errors. After the parity bit, the configuration bit sequence may be concluded by a stop bit. The stop bit may be the inverse of the start bit of the synchronisation sequence in order to guarantee at least one logical bit change between subsequent configuration bit sequences. So, the stop bit may be "1" if the start bit of the synchronisation sequence is "0". It should be noted that each bit sequence block starts with a least significant bit (LSB) and ends with a most significant bit (MSB), so that the LSB is the lowest bit and the MSB is the highest bit in the binary number of each bit sequence block.

Figure 6A:
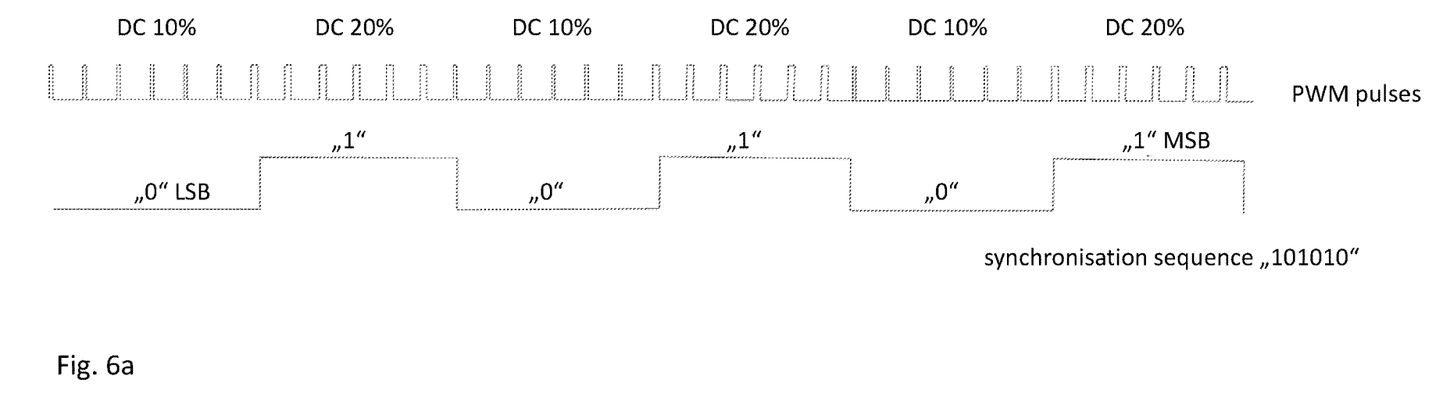
FIGS. 6a and 6b are views showing examples of a synchronization sequence and a length bit sequence according to the pre-determined UART protocol as shown in FIG. 5.

FIG. 6a shows a synchronisation sequence of "101010" that the PWM bit sequence detector module expects at the beginning of a configuration bit sequence.

Figure 6B:
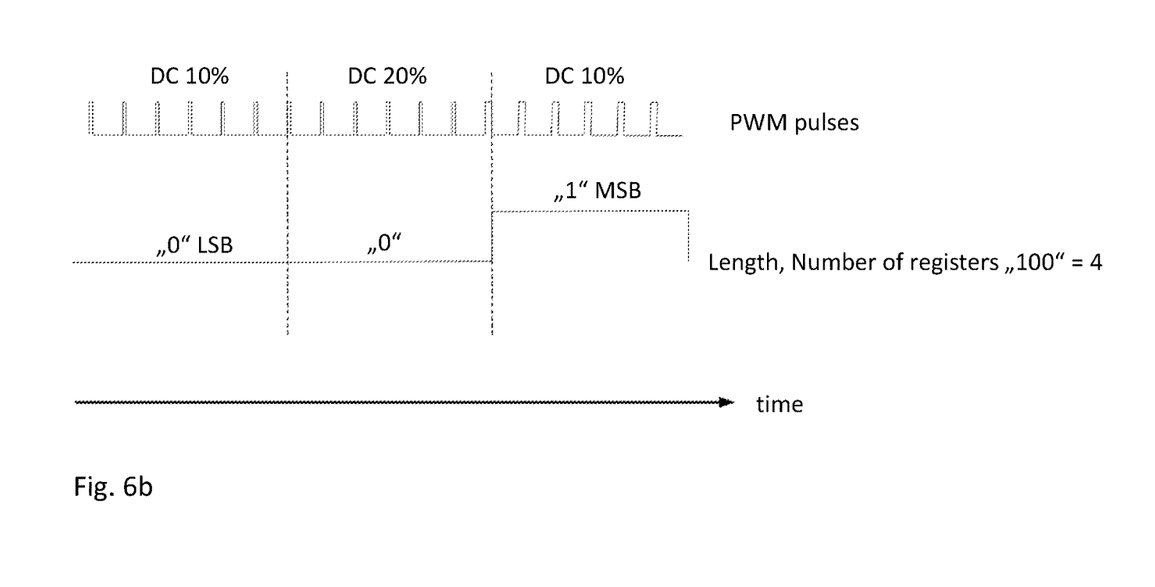
Figure 7:
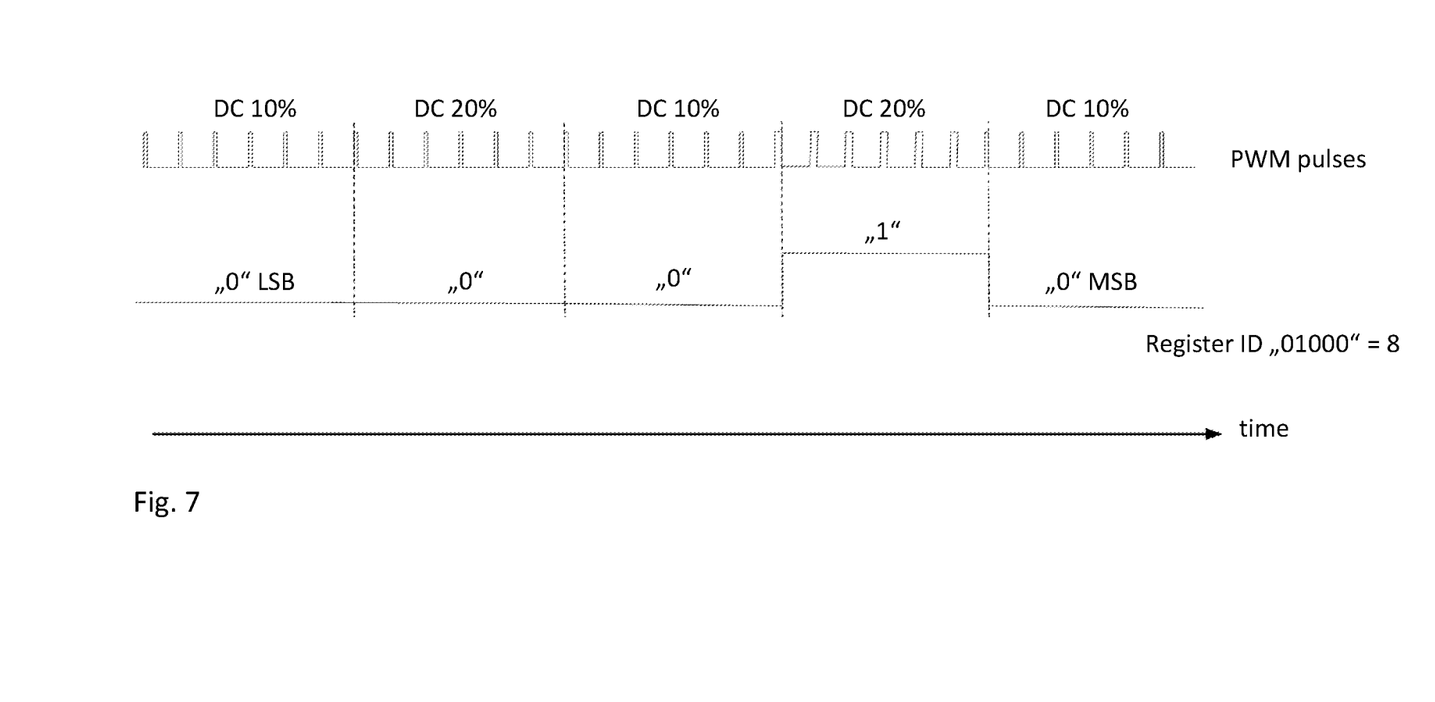
FIG. 7 is a view showing an example a register identification bit sequence according to the pre-determined UART protocol as shown in FIG. 5.

A pre-defined start bit sequence at the start of the configuration bit sequence may have a certain number of bits, e.g. six start bits "010101". Accordingly, the duty cycle is changed between 10% and 20% every 6th PWM pulse. FIG. 6b shows an example of the following three bits for the length or the number of registers to follow, i.e. here "100" four registers. FIG. 7 shows an example of the following five bits for the following register ID, i.e. here "01000"=8.

Figure 8:
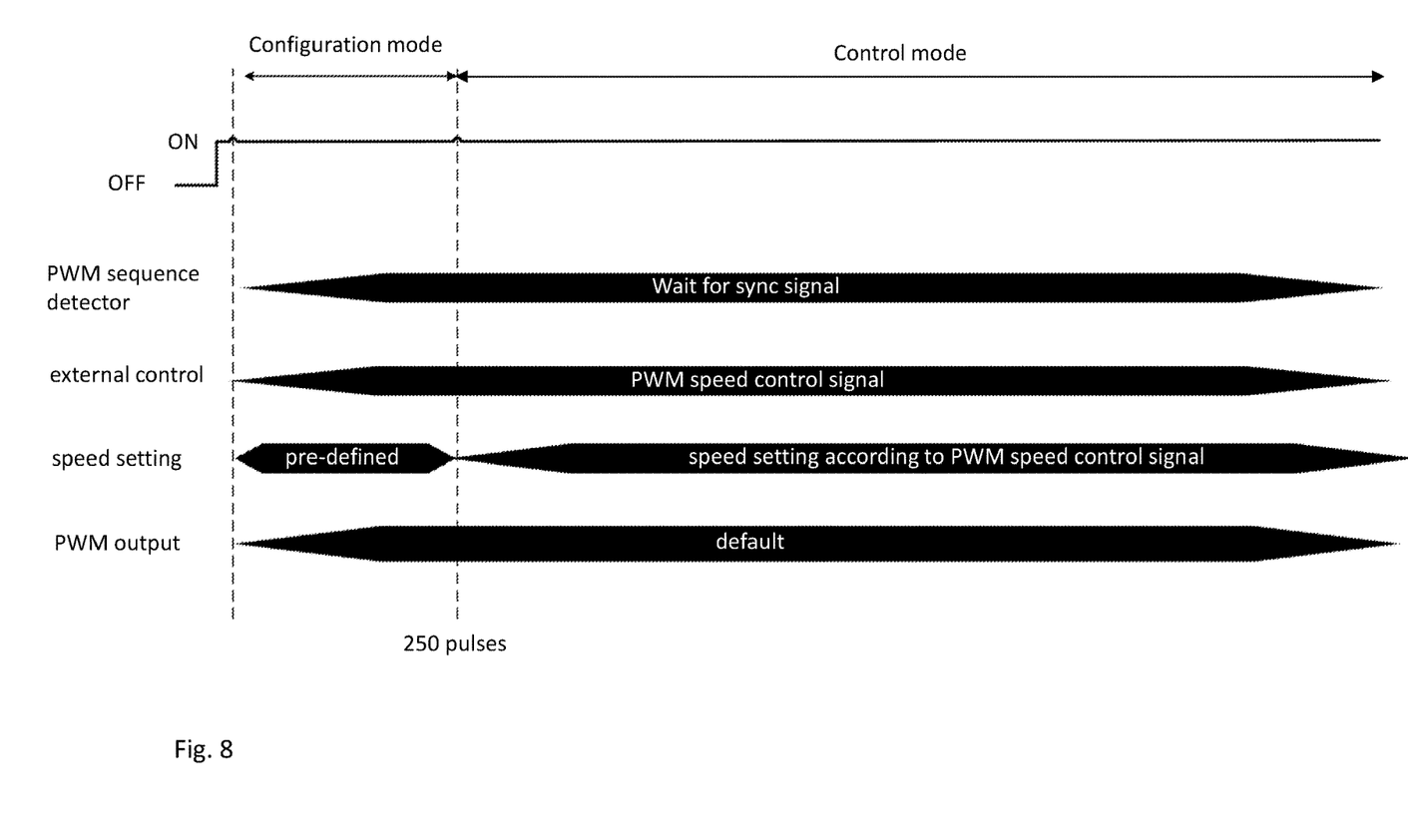
FIG. 8 is a view showing a behavior of the control module if no valid synchronization sequence is received within the pre-determined configuration window after start-up of the pump motor.

The behavior of the control module is shown in FIG. 8 if no valid synchronisation sequence is detected within the first 250 PWM pulses after the motor was switched on. The 250 PWM pulses represent a pre-determined configuration window, which corresponds to 250 ms at a PWM frequency of 1 kHz. The default mode of the control module after start-up is a configuration mode in which the speed is not set according to the received PWM control signal, but to a pre-defined speed setting. The pre-defined speed setting may be a re-configurable or fixed value, e.g. a minimum speed. The external control does not send a configuration bit sequence in this case. It sends an "ordinary" PWM control signal according to which the pump motor shall run. After the 250 PWM pulses or 250 ms have passed without receiving a valid synchronisation sequence, the control module is configured to switch to a control mode for using the PWM control signal to set the motor speed accordingly.

Figure 9:
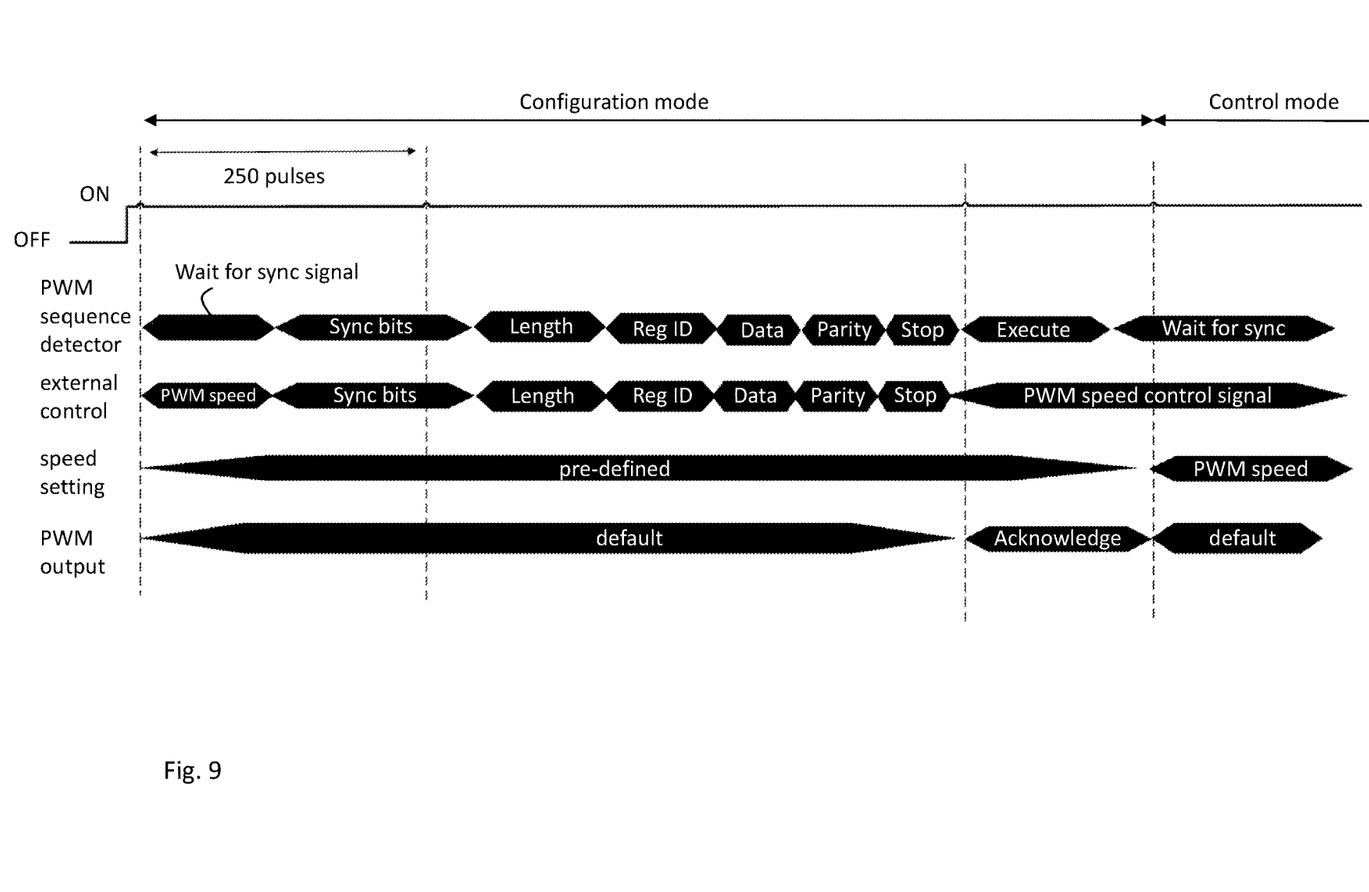
FIG. 9 is a view showing a behavior of the control module if a valid synchronization sequence is received within the pre-determined configuration window after start-up of the pump motor.

In FIG. 9, the external control does send a configuration bit sequence within the first 250 PWM pulses after start-up. Therefore, the configuration window is extended and the control module does not switch back to control mode after 250 PWM pulses. It stays in the initial configuration mode as long as it needs to receive the full configuration bit sequence, i.e. until the stop bit is received. During this time, the motor speed is set to the pre-defined speed setting. After the stop bit was successfully received, the configuration is executed by the control module and an acknowledge signal is send back to the external control to perform a handshake. The acknowledge signal may, for instance, be six pulses at 75% duty cycle. Once, the acknowledge signal is sent, the control module switches back to control mode to interpret the incoming PWM control signal as a speed setting. The PWM bit sequence detector module, however, returns to monitoring the PWM control signal for any synchronisation sequence that could indicate a start of a new configuration bit sequence.

Figure 10:
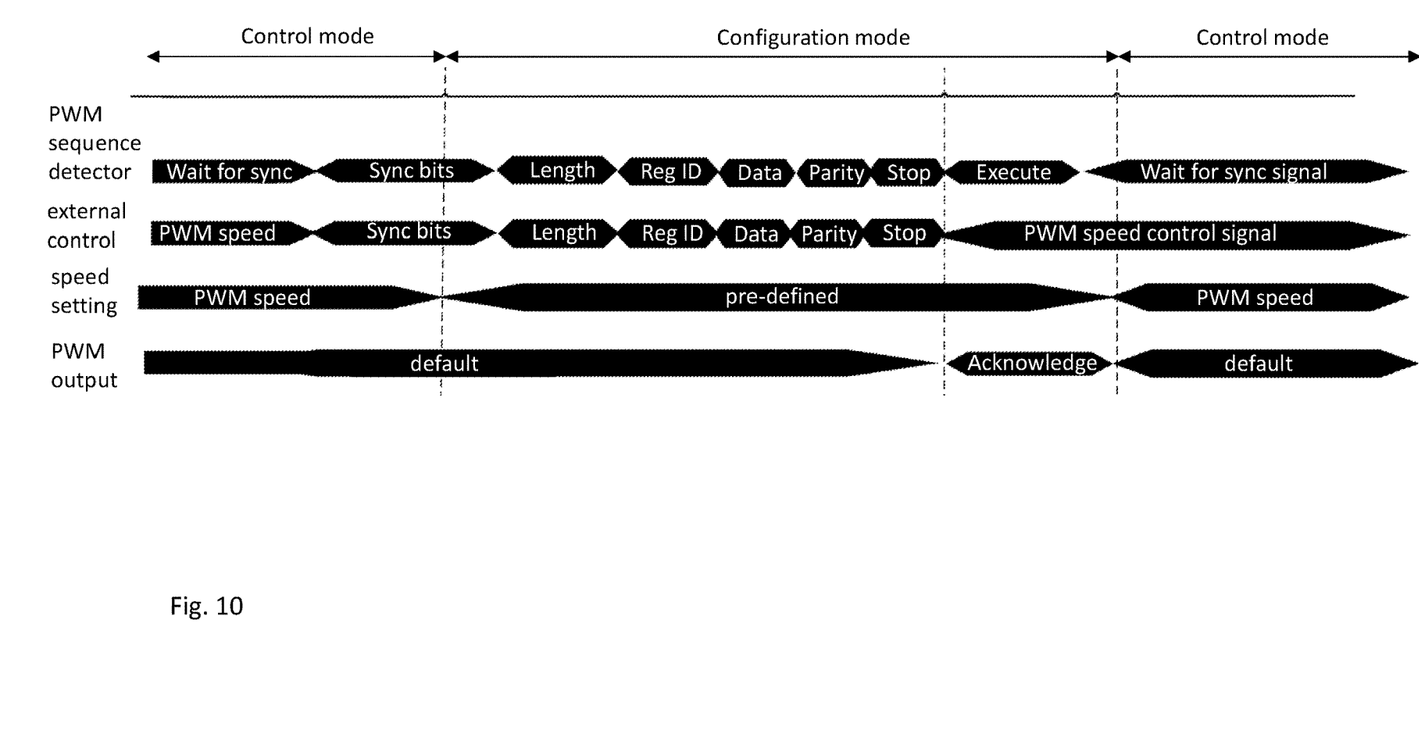
FIG. 10 is a view showing a behavior of the control module if a valid synchronization sequence is received when the pump motor is running at a speed according to the PWM control signal.

FIG. 10 shows a rare case of a configuration bit sequence being sent while the motor is running in control mode. In most cases, an external control will send a configuration bit sequence during the open configuration window after start-up. However, as the PWM bit sequence detector module continuously monitors the PWM control signal in the control mode, the control module can switch back to configuration mode if a valid synchronisation sequence is detected. The motor speed is then set to the pre-defined speed setting and the configuration mode is kept until the full configuration bit sequence is successfully received. After the acknowledge signal is sent, the control module switches back to control mode.

Figure 11:
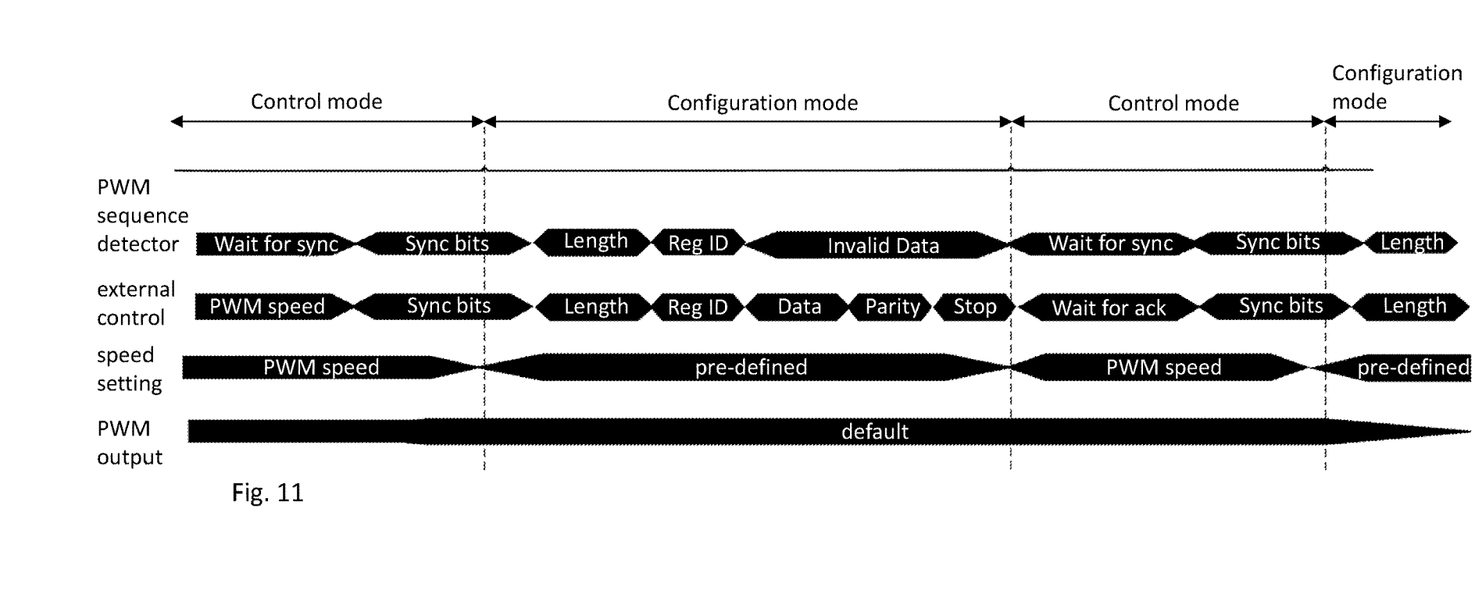
FIG. 11 is a view showing a behavior of the control module if an invalid configuration bit sequence is received.

FIG. 11 shows a failed configuration attempt in which the configuration mode is terminated due to invalid data. Having detected a corrupt, unexpected or non-compliant bit sequence, the control module switches to control mode and waits for another synchronisation sequence that indicates the beginning of a repeated configuration bit sequence. No acknowledge signal is sent back to the external control. If the external control does not receive the acknowledge signal, it repeats the configuration mode. Once the new synchronisation sequence is detected, the control module switches back to configuration mode for the next configuration attempt.

Figure 12:
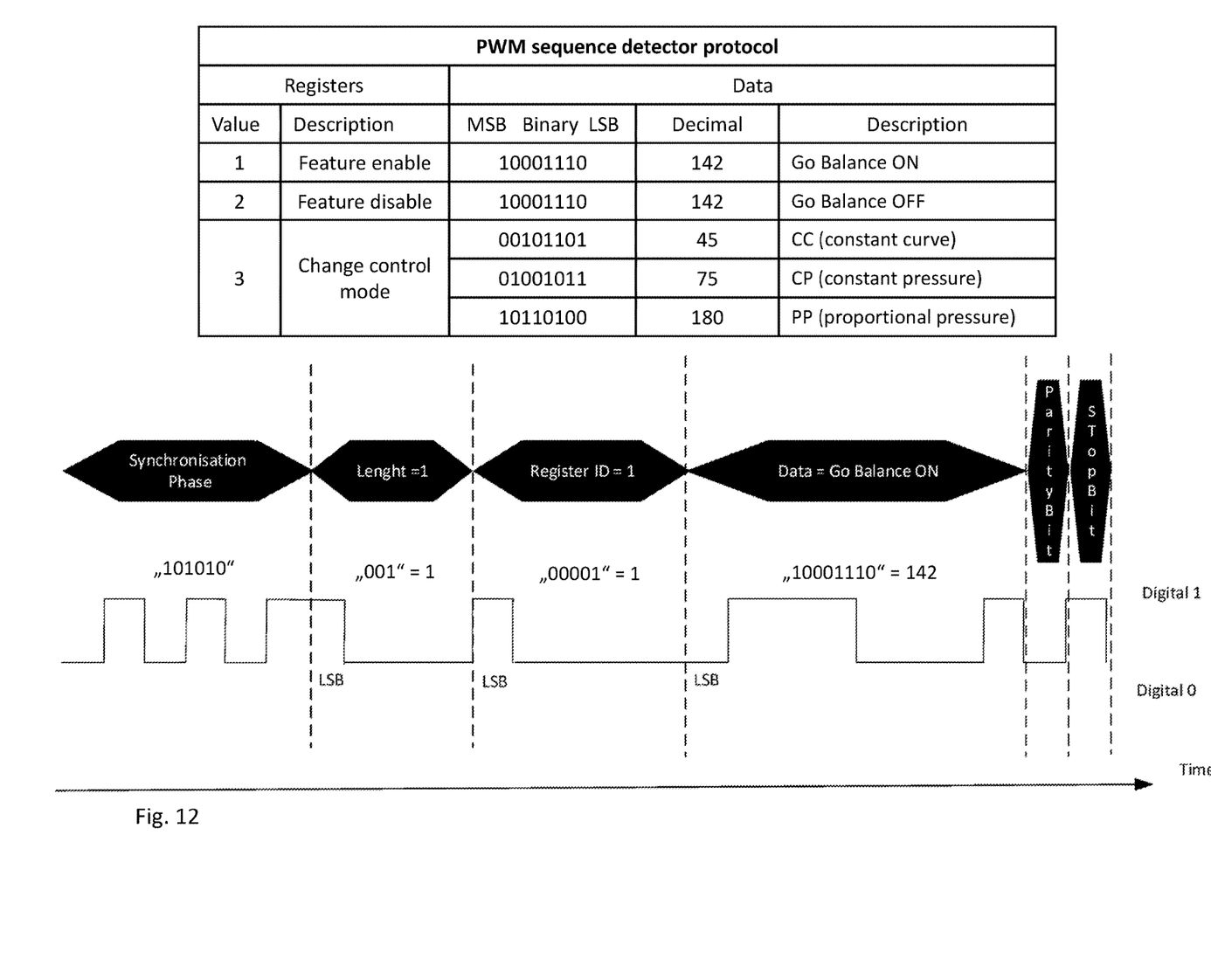
FIG. 12 is a view showing an example a PWM sequence detector protocol for configuring the pump assembly.

FIG. 12 shows an example of configuring the pump assembly 1 to enable the feature "Go balance", which is a hydraulic balancing by use of a connected smartphone app. The feature is enabled by the external control if the depicted configuration bit sequence is sent by changing the duty cycle of the PWM control signal accordingly.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one aspect or embodiment may be used alone, or in combination with other features described, and may also be used in combination with one or more features of any other of the aspects or embodiments, or any combination of any other of the aspects or embodiments. While at least one exemplary aspect or embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary aspects or embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

LIST OF REFERENCE CHARACTERS 1 pump assembly
3 pump housing
5 suction inlet
7 pressure outlet
9 motor housing
11 electronics housing
13 power socket
15 PWM socket DC duty cycle
LSB least significant bit
MSB most significant bit

What is claimed is:

1. A pump assembly comprising:
a pump unit comprising an impeller configured to pump fluid;
an electric motor for driving the impeller;
a control module configured to control a speed of the electric motor in a control mode; and
an interface configured to receive a pulse width modulated (PWM) control signal with a duty cycle indicative of the speed of the electric motor, wherein the control module is configured to interpret the PWM control signal at start-up of the electric motor per default in a configuration mode as a configuration bit sequence based on the duty cycle of the PWM control signal during a pre-determined configuration window, wherein the control module is configured to extend a length of the configuration window at least until the control module has received a full and valid configuration bit sequence under a condition that a valid synchronization sequence was detected in the interpreted configuration bit sequence.

2. The pump assembly according to claim 1, wherein a minimum length of the configuration window is defined by a pre-determined number of pulse width modulated pulses or a pre-determined time period.

3. The pump assembly according to claim 1, wherein the control module is configured to switch from the configuration mode to the control mode if the interpreted configuration bit sequence is not compliant with a pre-determined data protocol.

4. The pump assembly according to claim 3, wherein the pre-determined data protocol is a Universal Asynchronous Receiver Transmitter (UART) protocol.

5. The pump assembly according to claim 1, wherein the control module is configured to switch from the control mode to the configuration mode if the control module recognizes a valid synchronization sequence in the PWM control signal.

6. The pump assembly according to claim 1, wherein the control module is configured to send an acknowledgment signal via the interface after the control module has received a full and valid configuration bit sequence.

7. The pump assembly according to claim 1, wherein the control module is configured to control the speed of the electric motor in the control mode according to the received PWM control signal after a lapse of the configuration window.

8. The pump assembly according to claim 1, wherein a valid configuration bit sequence has a pre-determined maximum number of bits compliant with a pre-determined data protocol.

9. A method for controlling an electric motor for driving an impeller of a pump unit of a pump assembly, the method comprising:
receiving a pulse width modulated (PWM) control signal at an interface of the pump assembly;
interpreting the PWM control signal at start-up of the electric motor per default in a configuration mode as a configuration bit sequence based on a duty cycle of the PWM control signal during a pre-determined configuration window;
controlling the speed of the electric motor in a control mode according to the duty cycle of the received PWM control signal after a lapse of the configuration window; and
extending a length of the configuration window at least until the full configuration bit sequence has been received under a condition that a valid synchronization sequence was detected in the interpreted configuration bit sequence.

10. The method according to claim 9, further comprising validating the interpreted configuration bit sequence for being compliant with a pre-determined data protocol.

11. The method according to claim 10, wherein the pre-determined data protocol is a Universal Asynchronous Receiver Transmitter (UART) protocol.

12. The method according to claim 9, further comprising switching from the configuration mode to the control mode if the interpreted configuration bit sequence is found to be not valid.

13. The method according to claim 9, further comprising switching from the control mode to the configuration mode if a valid synchronization sequence is recognized in the PWM control signal.

14. The method according to claim 9, further comprising sending an acknowledgment signal via the interface after having received the full and valid configuration bit sequence.

15. The method according to claim 9, wherein a valid configuration bit sequence has a pre-determined maximum number of bits compliant with a pre-determined data protocol.

16. The method according to claim 15, wherein the pre-determined data protocol is a Universal Asynchronous Receiver Transmitter (UART) protocol.

17. A pump assembly comprising:
a pump unit comprising an impeller configured to pump fluid;
an electric motor for driving the impeller;
a control module configured to control a speed of the electric motor in a control mode, the control module comprising a configuration mode; and
an interface configured to receive a pulse width modulated (PWM) control signal with a duty cycle indicative of the speed of the electric motor, wherein the control module is configured to interpret the PWM control signal at start-up of the electric motor in the configuration mode as a configuration bit sequence based on the duty cycle of the PWM control signal during a pre-determined configuration window, wherein the configuration mode is a default mode for interpreting the PWM control signal, wherein the control module is configured to extend a length of the configuration window at least until the control module has received a full and valid configuration bit sequence under a condition that a valid synchronization sequence was detected in the interpreted configuration bit sequence.

* * * * *